July 19, 1949.  W. TUCKER  2,476,782
HAND DUMP TRUCK

Filed Aug. 20, 1947  2 Sheets-Sheet 1

Inventor

William Tucker

By Clarence A. O'Brien
and Harvey B. Jacobson
Attorneys

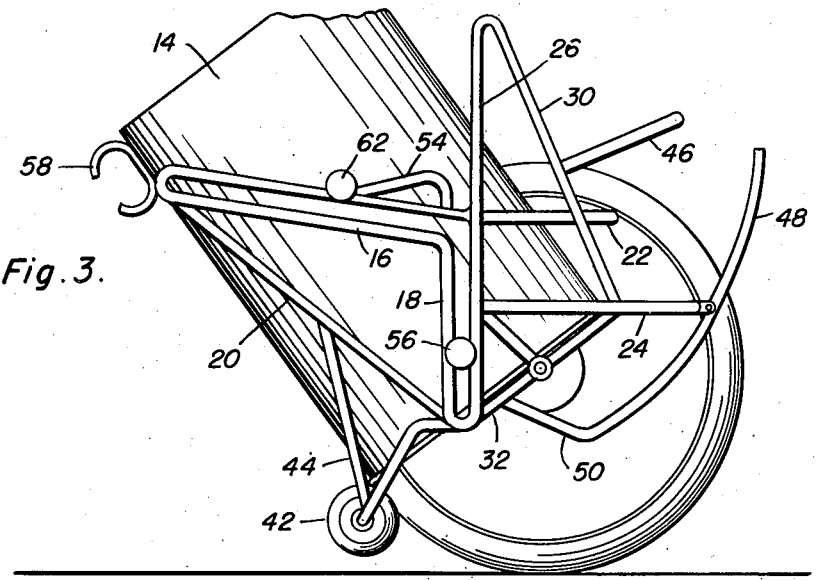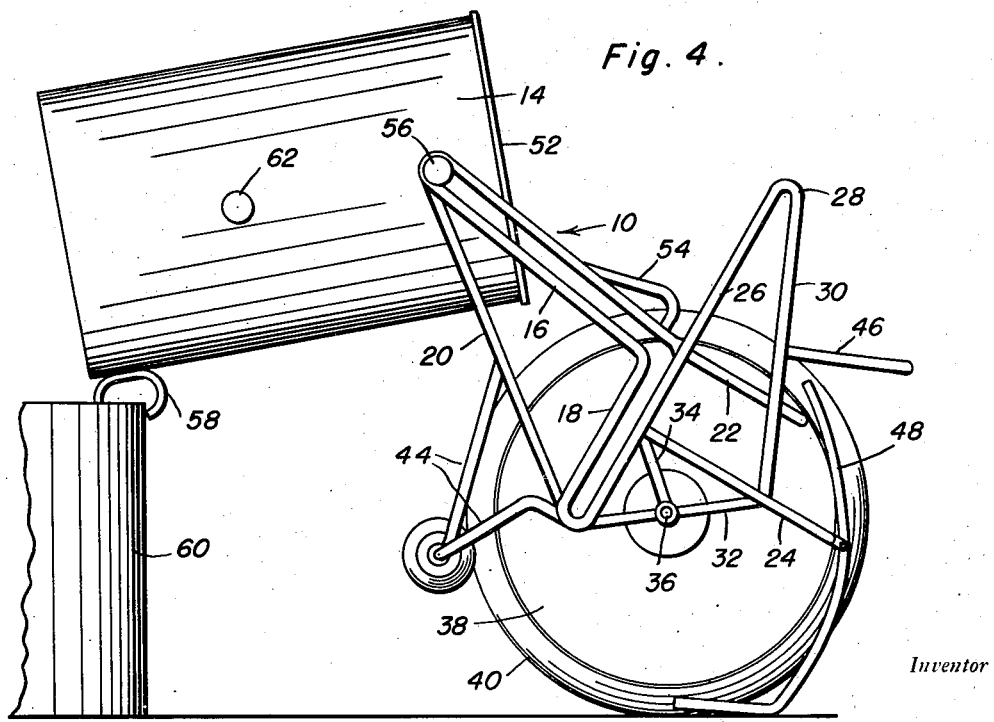

Patented July 19, 1949

2,476,782

UNITED STATES PATENT OFFICE 2,476,782

HAND DUMP TRUCK

William Tucker, High Point, N. C.

Application August 20, 1947, Serial No. 769,746

6 Claims. (Cl. 298—5)

This invention relates generally to hand trucks, and more particularly to a hand dump truck in which a wheeled frame is provided with guides in the sides thereof, and the receptacle carried by the wheeled frame is provided with trunnions adapted to slide within the said guides, in order to facilitate the dumping of the receptacle, together with other novel features adapted to make the device easily operated.

It is well understood that hand trucks including a wheeled frame and a receptacle have been developed and used heretofore, and such construction is not herein claimed broadly. The present invention does, however, include several features not heretofore incorporated in hand trucks, which features make this improved hand truck particularly adaptable for such uses as the transportation and dumping of garbage. A still more specific use for a truck of this character is the transportation of garbage to garbage collecting trucks of the type which have a platform or extending table on the end or side thereof adapted to function as a hopper for reception of the garbage which is carried by the conveyor from this platform or table into an enclosure or tank. The type of garbage collection truck described immediately above is commonly referred to as the Gar Wood type. Obviously, this invention is not limited to use with the specific apparatus mentioned above, but the provision of a hook on the receptacle, together with other features hereinafter described more fully, makes this improved hand truck particularly adapted for such use. When so used the hook is engaged on the rim portion of the above mentioned table or platform and the truck is made to recede the short distance, whereafter the receptacle is upturned, by manipulation of the truck frame.

A primary object of this invention is, therefore, to provide a wheeled frame and a receptacle, adapted to coact in a manner allowing the easy dumping of the receptacle, while the upper end thereof is hooked to a rim portion of the apparatus into which the receptacle is being dumped.

Another salient object of this invention is to provide a frame for such a hand truck in which the said trunnions are guided in vertical and horizontal planes, while the receptacle is being tilted and upturned.

Still another specific object of this invention is to provide lever means, whereby the receptacle can be urged upwardly as in the initial stages of the dumping operation.

Another specific object of this invention is to provide a third wheel which facilitates the preservation of the frame in proper orientation with respect to the receptacle, during a portion of the dumping operation.

Still another object of this invention, related to the specific structure, is to provide means auxiliary to the said trunnions and taking the form of bearing members spaced from the trunnions and adapted to engage the said guides in a manner allowing the easy retention of the receptacle in partially tilted position and in substantially vertically upright and locked position.

A general object of this invention is to facilitate the transportation and dumping of material, without the actual manual handling of a receptacle used to contain such material.

And a last object to be specifically mentioned is to provide a device of this character which is relatively inexpensive and practicable to manufacture, which is extremely simple and convenient to use, and which will give generally efficient and durable service.

With these objects, and other objects which will become apparent as this description proceeds, definitely in view, this invention resides in certain novel features of construction, combination and arrangement of parts and portions as will be hereinafter described in the specification, particularly pointed out in the appended claims, and illustrated in the accompanying drawings which form a material part of this application, and in which:

Figure 2:
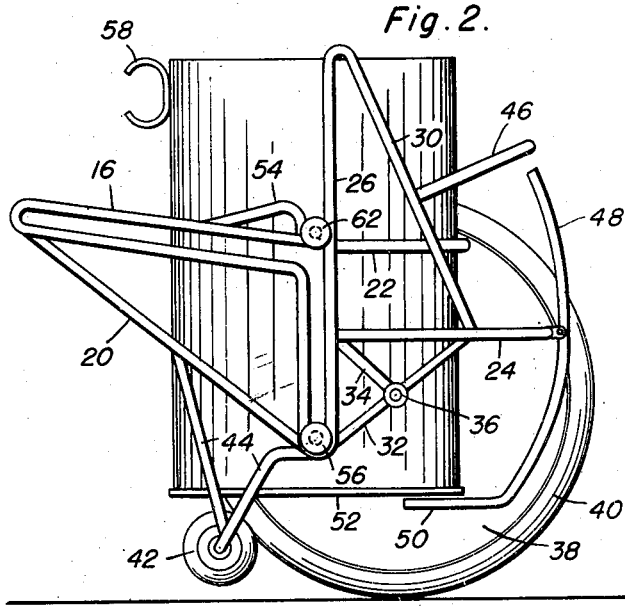
Figure 2 is a side elevational view of the same, with one of the wheels removed and the receptacle in upright and locked position.

Figure 3 is a view, similar to Figure 2, but showing the receptacle in unlocked and forwardly tilted position, as when the lever has been pulled rearwardly; and, Figure 4 is a view, similar to Figure 3, and showing the receptacle in more fully tilted position, and with the hook and the receptacle engaging the rim portion of a tank, the wheeled frame being tilted into a position forcing the elevation of the bottom of the receptacle.

Similar characters of reference designate similar or identical parts and portions throughout the specification and throughout the several views of the drawings.

Referring to the drawings in detail, it will be noted that this invention includes a frame which is preferably constructed from round stock as illustrated in the drawings, and which is comprised of a pair of similar guides 10 and 12, each of which consists of a closed loop of substantially right angular form. When the frame is in normal upright position, as when transporting the receptacle 14, the leg 16 of the guide is substantially horizontal, although the drawings indicate a preferred upward inclination of this leg 16, while the leg 18 of each guide is disposed substantially vertically. The ends of the legs 16 and 18 are joined by a brace 20, and a pair of substantially semi-circular receptacle support bars 22 and 24 are terminally secured to the elbow portions and to the intermediate portions of the vertical legs 18 of the guides, respectively. Otherwise stated, the semi-circular bars 22 and 24 are disposed in horizontal parallel planes with the shorter of the two bars spaced above the longer bar 24, and both the bars 22 and 24 extending rearwardly of the frame. The rear bar of the leg 18 is extended beyond the top of the horizontal leg 10 and this extending portion 26, on each side of the frame is bent at the top 28 and is continued angularly downwardly and to the rear, as at 30. The brace 32 is secured between the adjacent lower ends of the vertical legs 18 of the guides at the lower ends of the parts indicated at 30, it being noted that the semi-circular bar 24 is connected to the rear ends of the braces 32 and the bottom ends of the members indicated at 30. The braces 32 are further supported by braces 34, and stub axles 36 are carried by the braces 32, at the point of juncture with the braces 34. A pair of wheels 38, preferably pneumatic tired as indicated at 40 are carried by these stub axles 36.

A third wheel 42 is carried by the braces 44 which are connected to the bottom ends of the vertical legs 18 of each guide and to the braces 20. It should be noted that the third wheel 42 will normally be raised from the ground when the leg 18 is in strictly vertical position, as indicated in Figure 2. The frame is provided with a handle 26 which is of bar character and is terminally secured to the members indicated at 30.

A lever 48 is pivoted at an intermediate point thereof to the central portion of the lower semi-circular bar 24 and this lever has a terminal portion 50 adapted to engage the lower end 52 of the receptacle 14 when the top of the lever is pulled rearwardly by the operator. The frame construction is completed by the provision of a pair of upwardly bent locking members 54, secured to the upper side of the horizontal legs 16 of the guides, so that a space is left between the rear portion of the locking members and the upwardly extending members 26.

The receptacle 14 is represented as comprising a hollow cylindrical body, although the exact shape of the receptacle is immaterial in this application. A pair of trunnions 56 are rigidly secured to the sides of the container, adjacent the lower end 52 thereof and on opposite sides of the receptacle. These trunnions slide within the guides 10 and 12, that is, within the legs 16 and 18 of the guides, when the receptacle 14 is moved relative to the frame, as by the actuation of the lever 48, all as hereinafter described.

The forward upper end of the receptacle 14 is provided with a hook 58 which is adapted to be engaged with a rim portion of a tank 60, or as above described, with a rim portion of the platform or table of a garbage collection vehicle. The construction of the truck is completed by provision of a pair of bearing members 62, secured to the sides of the receptacle and immediately above the trunnions 56 and substantially centrally of the length of the receptacle. These bearing members are somewhat similar in construction to the trunnions 56, but these bearing members are disposed outside the guides 10 and 12.

Figure 1:
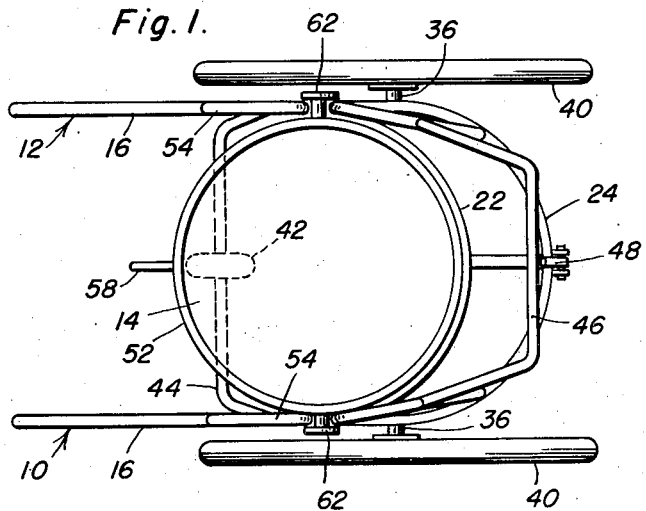
Figure 1 is a top plan view of this improved hand dump truck.

The operation of this invention will be reasonably clearly understood from the foregoing description of the mechanical details thereof, taken in connection with the above recitation of the objects sought to be achieved by this invention. In greater detail, however, the operation of this invention will include the transportation of the receptacle 14 by the wheeled frame while the receptacle is disposed within the wheeled frame as indicated in Figures 1 and 2. When it is desired to dump the receptacle the lever 48 is moved rearwardly so that the terminal 50 of the lever contacts the bottom 52 of the receptacle forcing the same upwardly, while the top of the receptacle naturally tilts forward, after the receptacle has been elevated sufficiently to release the bearing members 62 from the locking members 54. Thereafter, further movement of the lever 48 causes the elevation of the trunnions 56 throughout the length of the vertical legs 18 of the guides and the bearing members 62 slide over the top surfaces of the horizontal legs 16 of the guides, as best indicated in Figure 3. When the receptacle has been tilted to this degree, the next step is to engage the hook 58 with fixed structure illustrated in the drawings at 60. The third wheel 52 will then be used to aid in the stabilization of the wheeled frame so that the legs 16 of the guides will be maintained in substantially horizontal positions, while the truck, that is the wheeled frame, is moved rearwardly or retracted away from the fixed structure 60. It should be noted that this last mentioned step is not illustrated in the drawings, although this step is an important feature of the invention. When the wheeled truck has been retracted so that the trunnions 56 are at the ends of the horizontal legs 16, the handle 46 is depressed causing the frame of the truck to pivot about the stub axles 36 and to raise the forward ends of the horizontal legs 16 so that the receptacle is tilted as indicated in Figure 4. If desired the lever 48 may be used to limit the tilting of the wheeled frame by allowing the terminal 50 of the lever to engage the ground, as indicated in this Figure 4. Finally the above mentioned steps of operation are repeated in reverse order, after the contents of the receptacle 14 have been emptied therefrom.

Obviously, many minor variations may be made in the detail of construction of the wheeled frame and receptacle, the illustration of a wheeled frame constructed of round bar stock is merely a preferred practical form and capable of considerable modification all within the scope and spirit of this invention. Accordingly, limitation of this invention should be in accordance only with the proper interpretation of the terms used in the appended claims.

Having described the invention, what is claimed as new is:

1. A hand dump truck comprising a wheeled frame having vertical closed guides on the sides thereof, a receptacle within said frame and having trunnions on the sides thereof adapted to slide within said guides, and bearing members on the sides of the receptacle frictionally and exteriorly engaging said guides.

2. A hand dump truck comprising a wheeled frame having closed guides in vertical planes on the sides of the frame, a locking member on each guide, a receptacle within said frame and having trunnions on the sides thereof adapted to slide within said guides, and bearing members on the sides of the receptacle frictionally and exteriorly engaging said guides and removably engageable with said locking members.

3. A hand dump truck comprising a wheeled frame having guides on the sides of the frame, a receptacle having trunnions adapted to slide within said guides, the guides being of slot character and closed at the ends, each guide comprising a pair of right angularly disposed portions, an external pocket at the junctions of said portions, bearing members on the sides of the receptacle frictionally and externally engageable with certain of said portions and removably engageable in said pockets.

4. A hand dump truck comprising a wheeled frame having guides on the sides of the frame, a receptacle having trunnions adapted to slide within said guides, the guides being of slot character and closed at the ends to limit the movement of said receptacle, and a hook on said receptacle engageable with fixed structure to facilitate the tilting and upturning of said receptacle.

5. A hand dump truck comprising a wheeled frame having guides on the sides of the frame, a receptacle having trunnions adapted to slide within said guides, the guides being of slot character and closed at the ends to limit the movement of said receptacle, and a hook on said receptacle engageable with fixed structure to facilitate the tilting and upturning of said receptacle, said guides having communicating portions substantially horizontal and vertical when the frame is in a position for transporting said receptacle, and a ground contacting wheel on said frame to limit the forward tilting of the frame when said hook is engaged with said fixed structure and while the said trunnions are traversing the horizontal portions of said guides.

6. A hand dump truck comprising a wheeled frame having guides on the sides of the frame, a receptacle having trunnions adapted to slide within said guides, the guides being of slot character and closed at the ends to limit the movement of said receptacle, said guides having communicating portions substantially horizontal and vertical when the frame is in a position for transporting said receptacle, a hook on said receptacle engageable with fixed structure to facilitate the tilting and upturning of said receptacle, and a pair of bearing members spaced from said trunnions and carried by said receptacle and adapted to engage said substantially horizontal portions while said trunnions are engaged in said substantially vertical portions.

WILLIAM TUCKER.

REFERENCES CITED

The following references are of record in the file of this patent:

UNITED STATES PATENTS

| Number | Name | Date |
|---|---|---|
| 1,383,513 | Barnett et al. | July 5, 1921 |
| 2,084,711 | Smith | June 22, 1937 |
| 2,102,684 | Dorward | Dec. 21, 1937 |